US010764341B2

United States Patent
Reid et al.

(10) Patent No.: US 10,764,341 B2
(45) Date of Patent: Sep. 1, 2020

(54) SYSTEM FOR ROUTING MULTICAST PAGE/PARTY CALL AUDIO AMONG VOICE OVER INTERNET (VOIP) DEVICES IN DIFFERENT LOCAL AREA NETWORKS (LANS) VIA INTERNET

(71) Applicant: Hubbell Incorporated, Shelton, CT (US)

(72) Inventors: Jeffrey T. Reid, Sinking Spring, PA (US); Keith Youndt, Pottstown, PA (US); Jason Fox, Bechtelsville, PA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/444,676

(22) Filed: Jun. 18, 2019

(65) Prior Publication Data

US 2019/0394246 A1    Dec. 26, 2019

Related U.S. Application Data

(60) Provisional application No. 62/687,306, filed on Jun. 20, 2018.

(51) Int. Cl.
*H04L 12/66* (2006.01)
*H04L 29/06* (2006.01)
*H04L 29/12* (2006.01)

(52) U.S. Cl.
CPC ............ *H04L 65/403* (2013.01); *H04L 12/66* (2013.01); *H04L 61/2069* (2013.01);
(Continued)

(58) Field of Classification Search
None
See application file for complete search history.

(56) References Cited

U.S. PATENT DOCUMENTS 9,351,129 B2   5/2016  Zukas et al.
10,051,129 B2  8/2018  Newman et al.
(Continued)

FOREIGN PATENT DOCUMENTS

WO    2016034650 A1    3/2016

OTHER PUBLICATIONS

International Search Report and Written Opinion dated Sep. 9, 2019, which issued in the corresponding PCT Patent Application No. PCT/US2019/037718.

*Primary Examiner* — Amal S Zenati
(74) *Attorney, Agent, or Firm* — Dickinson Wright PLLC (57) ABSTRACT

A gateway is configured to be situated in a local area network (LAN) of Internet Protocol (IP)-based units having a serverless page party (SP2) function that employs multicast technology for page/party audio. The gateway converts multicast call traffic to unicast call traffic for transmission over the Internet to one or more IP units with SP2 function in different LANs. These different LANs are each provided with respective gateways that are configured to convert the unicast traffic back to multicast traffic to connect the page/party audio of an SP2 system among disparate facilities having different LANs, obviating the need for a dedicated and expensive wide area network for inter-LAN communication among IP units with SP2 function. A license and configuration server is configured to maintain a database of IP addresses of each gateway assigned to the respective inter-LAN or Internet groups and to communicate group IP addresses to the gateways.

9 Claims, 7 Drawing Sheets

(52) U.S. Cl.
CPC ........ *H04L 65/4076* (2013.01); *H04L 65/608* (2013.01); *H04L 69/22* (2013.01)

(56) References Cited

U.S. PATENT DOCUMENTS

| | | | |
|---|---|---|---|
| 2005/0076207 A1* | 4/2005 | Park | H04L 12/1836 713/163 |
| 2006/0056427 A1* | 3/2006 | Sato | H04L 12/4633 370/401 |
| 2017/0366672 A1* | 12/2017 | Newman | H04M 3/56 |
| 2018/0278662 A1 | 9/2018 | Rumsby | |
| 2019/0058783 A1 | 2/2019 | Reid | |

* cited by examiner

SYSTEM FOR ROUTING MULTICAST PAGE/PARTY CALL AUDIO AMONG VOICE OVER INTERNET (VOIP) DEVICES IN DIFFERENT LOCAL AREA NETWORKS (LANS) VIA INTERNET

The application claims the benefit of U.S. Provisional Patent Application Ser. No. 62/687,306, filed Jun. 20, 2018, the entire contents of which are hereby incorporated herein by reference.

BACKGROUND

Technical Field

Illustrative embodiments relate to devices and methods for using the Internet to interconnect Internet protocol (IP) communications devices that employ multicast technology for page/party communications in local area networks (LANs) with other such IP communications devices in different LANs.

Background

Internet Protocol (IP)-communications units or stations that employ multicast technology for page/party communications in local area networks (LANs) are commercially available from GAI-Tronics Corporation in Mohnton, Pa. GAI-Tronics Corporation, for example, manufactures both conventionally housed and ruggedized products for providing voice over Internet protocol (VoIP) telephones, Public Address and General Alarm (PA/GA) systems and other communication system units or stations. GAI-Tronics Corporation's multicast technology-based IP units are useful in many applications (e.g., an intraplant paging system to complete an industrial plant's communication, monitoring, and emergency notifications) and in many environments such as on an oil rig or in a refinery or railway system, among others.

Currently, to connect the page/party audio of multicast technology-based IP communications stations among disparate facilities with respective LANs would typically require a dedicated and expensive wide area network (WAN) to allow all IP units to communicate with each other.

SUMMARY

The above and other problems are overcome, and additional advantages are realized, by the illustrative embodiments.

In accordance with an illustrative embodiment, a gateway is configured to send Internet protocol (IP) unit multicast audio call traffic via the Internet and comprises a communications interface to a local area network (LAN) to which IP units are connected. The IP units are configured to send and receive page audio with respect to other IP units and to participate in a party line call with other IP units using multicasts. The gateway further comprises a communications interface to the Internet, a memory device and a processor. The memory device is configured to store an IP address for each of one or more gateways in at least one designated inter-LAN group that are located in different LANs and that perform inter-LAN communication with the gateway, and to store configuration information comprising sockets for page audio and party line calls assigned to the IP units in the LAN. The processor is configured to roast from a remote database the IP addresses of the gateways that are assigned to each Inter-LAN groan that performs inter-LAN communication with the gateway and to store the IP addresses in the memory device, each inter-LAN group comprising designated IP units from different LANs that can communicate with each other via multicast, receive a multicast from an IP unit in the LAN and convert the multicast to respective unicasts using the IP addresses of gateways in the designated group that corresponds to the multicast before transmission thereto via the Internet, the multicast destined for IP units in one or more different LANs that correspond to the desiccated inter-LAN group. Further, the processor is configured to receive unicasts from the Internet and convert the unicasts to a multicast provided to a corresponding socket based on the configuration information of the IP units in the LAN.

In accordance with an aspect of an illustrative embodiment, the processor is further configured to request from a server the IP addresses of gateways assigned to one or more inter-LAN groups and to store the IP addresses in the memory device and corresponding group identifiers. For example, the server is configured to store the configuration information of the IP units in the respective LANs.

In accordance with an aspect of an illustrative embodiment, the processor is configured to convert multicast real-time protocol (RTP) traffic in the multicast to unicast RTP traffic and to route the unicast RTP traffic to the IP addresses of the gateways in a designated one of the groups.

In accordance with an illustrative embodiment, a method is provided for sending multicast audio call traffic among Internet protocol (IP) units via the Internet and comprises providing gateways at respective local area networks (LANs) of IP units. The IP units are configured to send and receive page audio with respect to other IP units and to participate in a party line call with other IP units using multicasts. The method further comprises assigning IP units from different ones of the LANs to one or more Internet groups and, for each Internet group, storing the IP addresses of the gateways corresponding to the IP units assigned to that Internet group at each of the gateways that correspond to that Internet group. The method also comprises receiving, at a gateway, a multicast from an IP unit in its LAN that corresponds to at least one of page audio and party line audio, the multicast destined for a designated one of the Internet groups, and converting the multicast to respective unicasts using the stored IP addresses of the corresponding gateways in the designated one of the Internet groups, before transmitting the unicasts via the Internet.

In accordance with an aspect of an illustrative embodiment, the unicasts comprise streams of packets with overhead information and audio payload. The overhead information identifies the IP unit that is the source of the audio payload and provides a sequence number to allow an IP unit receiving the packets to organize and mix the streams in accordance with the at least one of page audio and party call audio in the multicast.

In accordance with an aspect of an illustrative embodiment, the method further comprises receiving unicasts from the Internet at corresponding gateways in the designated Internet group, and the corresponding gateways converting the unicasts to a multicast.

In accordance with an aspect of an illustrative embodiment, the method further comprises storing, using at least one of the gateways and a server, configuration information comprising sockets for page audio and party line calls assigned to the IP units in the LAN corresponding each of the gateways.

In accordance with an aspect of an illustrative embodiment, the method further comprises corresponding ones of the gateways in the designated Internet group providing the multicast to a corresponding socket based on the configuration information of the IP units in the LANs associated with the corresponding gateways.

Additional and/or other aspects and advantages of the illustrative embodiments will be set forth in the description that follows, or will be apparent from the description, or may be learned by practice of the illustrative embodiments. The illustrative embodiments may comprise VoIP telephone units and systems and methods for operating same having one or more of the above aspects, and/or one or more of the features and combinations thereof. The illustrative embodiments may comprise one or more of the features and/or combinations of the above aspects as recited, for example, in the attached claims.

BRIEF DESCRIPTION OF THE DRAWINGS

The above and/or other aspects and advantages of illustrative embodiments will be more readily appreciated from the following detailed description, taken in conjunction with the accompanying drawings, of which.

Throughout the drawing figures, like reference numbers will be understood to refer to like elements, features and structures.

DETAILED DESCRIPTION OF ILLUSTRATIVE EMBODIMENTS

Reference will now be made in detail to illustrative embodiments, which are illustrated in the accompanying drawings. The embodiments described herein exemplify, but do not limit, the claims by referring to the drawings.

Illustrative embodiments will be described herein with reference to one or more Internet protocol (IP) units, several of which are described in more detail below as examples. Generally, an IP-based product or unit 16, when operated as a VoIP telephone in a Phone operational mode, allows the user to make session initiation protocol (SIP)-based IP telephone calls such as point-to-point calls, voice pages and party line communications. The calls can be in hands free or handset mode, depending on how the unit is built 16 (i.e., with handset, or with flush mounted speaker and microphone and hot dial button or help button). The IP unit 16 ensures that a SIP server/IP PBX is available for proper registration. Some example operations of a VoIP telephone are described in commonly owned WO/2015/031624, which is incorporated by reference herein.

The IP unit 16 can also have a serverless page/party (SP2) function as described in WO 2016/100795 which is incorporated by reference herein. An IP unit 16 with SP2 function is a paging and intercom system that combines the simplicity of "press to page, release to party" operation with multicast voice over Internet protocol (VoIP) technology to provide virtually instant communication in the most demanding of environments. An IP unit 16 with SP2 function is wired to the nearest network switch using CAT5/CAT5E Ethernet cable, or Fiber Optic Cable, for example. Local power is supplied to the IP unit 16 either as a separate power cable or contained in a hybrid power/network cable. Multiple IP units 16 with SP2 function can operate in a "serverless" system. While other paging systems rely on servers to route calls and administrate the system, the SP2 function employs multicast technology, bypassing the need for servers and resulting in a number of benefits described below.

One type of illustrative IP unit 16 described below with reference to FIG. 5C has a universal application platform (UAP) for operating as a multi-functional device over Ethernet in any of a plurality of operational modes. The operational modes can include, but are not limited to, "serverless" page-party (SP2) system mode, VoIP phone mode, IP access panel mode (e.g., alarm activation for a central public address/general alarm (PA/GA) system), point-to-point intercom mode, and so on, for example, all by utilizing graphical user interface (GUI) screens on a touch screen display that are designed specifically for each operational mode.

Additional aspects of illustrative IP-based units 16 are described below in connection with FIGS. 5A, 5B, 5C and 6.

Serverless Page/Party (SP2) Function Over Internet

It is desired to connect point-to-point audio and the page/party audio of a SP2/UAP system among disparate facilities (e.g., for communications between an oil rig and a land-based facility). An example implementation depicted in FIG. 1 comprises plural local area networks (LANs) wherein the IP units 16 in a LAN or subnet 12a are unable to communicate with IP units 14 in another LAN or subnet 12b, 12c, . . . , 12n. Accomplishing inter-LAN or subnet 12 communications can require using a dedicated and expensive wide area network (WAN) to allow all IP units 16 to communicate with each other. An alternative to using such an expensive, dedicated WAN, however, is to utilize the Internet in place of the WAN to connect these disparate systems in accordance with an illustrated embodiment described below in connection with FIG. 2.

Figure 1:
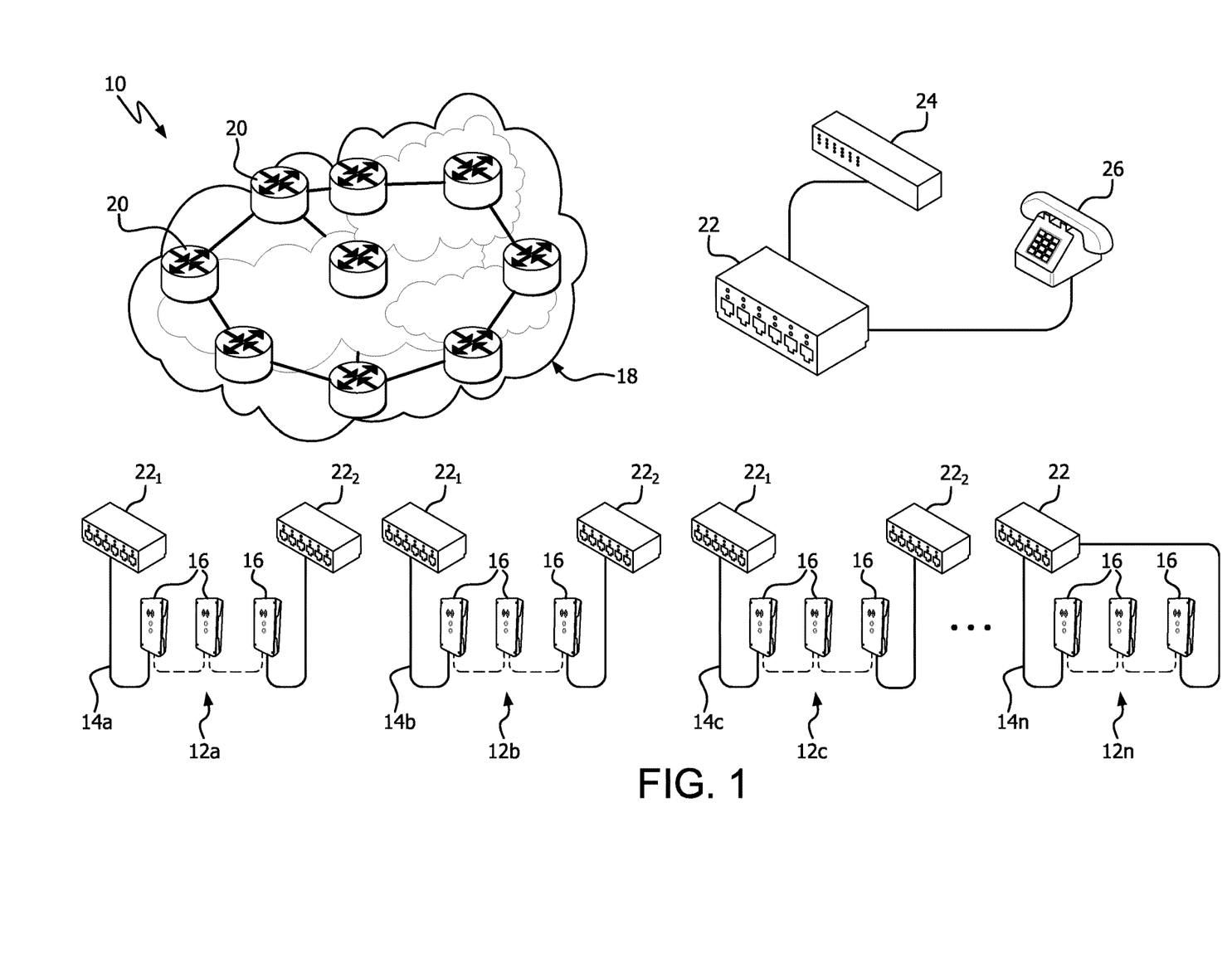
FIG. 1 depicts a system wherein IP units are deployed in different local area networks (LANs) but cannot communicate with IP units in a different LAN.

A system without inter-LAN or subnet 12 communications (i.e., FIG. 1) will now be described, followed by a description of the illustrative embodiment of FIG. 2 employing inter-LAN or subnet 12 communications. With reference to FIG. 1, a plurality of IP units 16 are deployed in string or ring topologies, with each telephone being linked only to its neighbors except for the two end IP units 16 that are connected to a wider network via other devices. In the example VoIP system 10, each of plural groups 12a, . . . , 12n of IP units 16 has its own separate subnet and virtual local area network (VLAN) via fiber 14a, . . . , 14n to which all group members 16 are connected (e.g., to constrain multicast packets). The use of a VLAN allows local multicast to be contained within the group 12 or string. VLAN IDs need not be unique across the system 10.

Due to the bidirectional fiber 14, switches 22 are configured for port blocking to prevent network loops. Each subnet terminates at a switch 22 that supports a spanning tree protocol (e.g., STP) to prevent network loops. Each end IP unit in a group 12 can be connected to a switch $22_1$ and $22_2$, that is, there can be two network switches per string or group 12. Each switch 22 is connected to the wider network 18 via a Layer 3 router 20. Since only one router is active at a time, routers 20 can run a redundancy protocol (e.g., virtual router redundancy protocol or VRRP) so that a group 12 or string can survive a loss of one of the routers 20. The active router 20 operates as a gateway for the string subset of a group 12. Switches $22_1$ and $22_2$ in a group 12 have direct connection between them (e.g., either a physical link or on OSI Layer 2 connection through a service provider) via the network cloud 18. In the event of a loss of a link within a string of a group 12, a route remains from each telephone 16 to the active router 20 or gateway and from each telephone 16 to all of the other telephones 16 in the string (for multicast conferencing).

With continued reference to FIG. 1, a SIP server 24 and operator station 26 are also connected to the cloud 18. Connections to the "cloud" or network 18 are omitted from FIG. 1 for clarity. As stated above, the network 18 consists of routers 20 forming a single Layer 3 network architecture, supporting multiprotocol label switching (MPLS) or similar data-carrying protocol. To achieve redundancy, the VoIP telephones 16 are connected in a fiber ring 14, connected to the wider network 18 by means of network routers 20. It is possible, however, to have a spur (i.e., only one end terminates at a switch 22), resulting in a loss of redundancy. The network 18 to which the fiber rings 14 of groups 12 are connected is configured to allow large numbers of groups 12 to be deployed, and with a group 12 having as many as 20 IP units 16, for example, or more. The network 18 allows IP units 16 in any group 12 to communicate with a common SIP server 24 in the network without conflict. In addition, the groups 12 have sufficient resilience to survive a loss of any one telephone 16 or link associated with each group 12.

Figure 2:
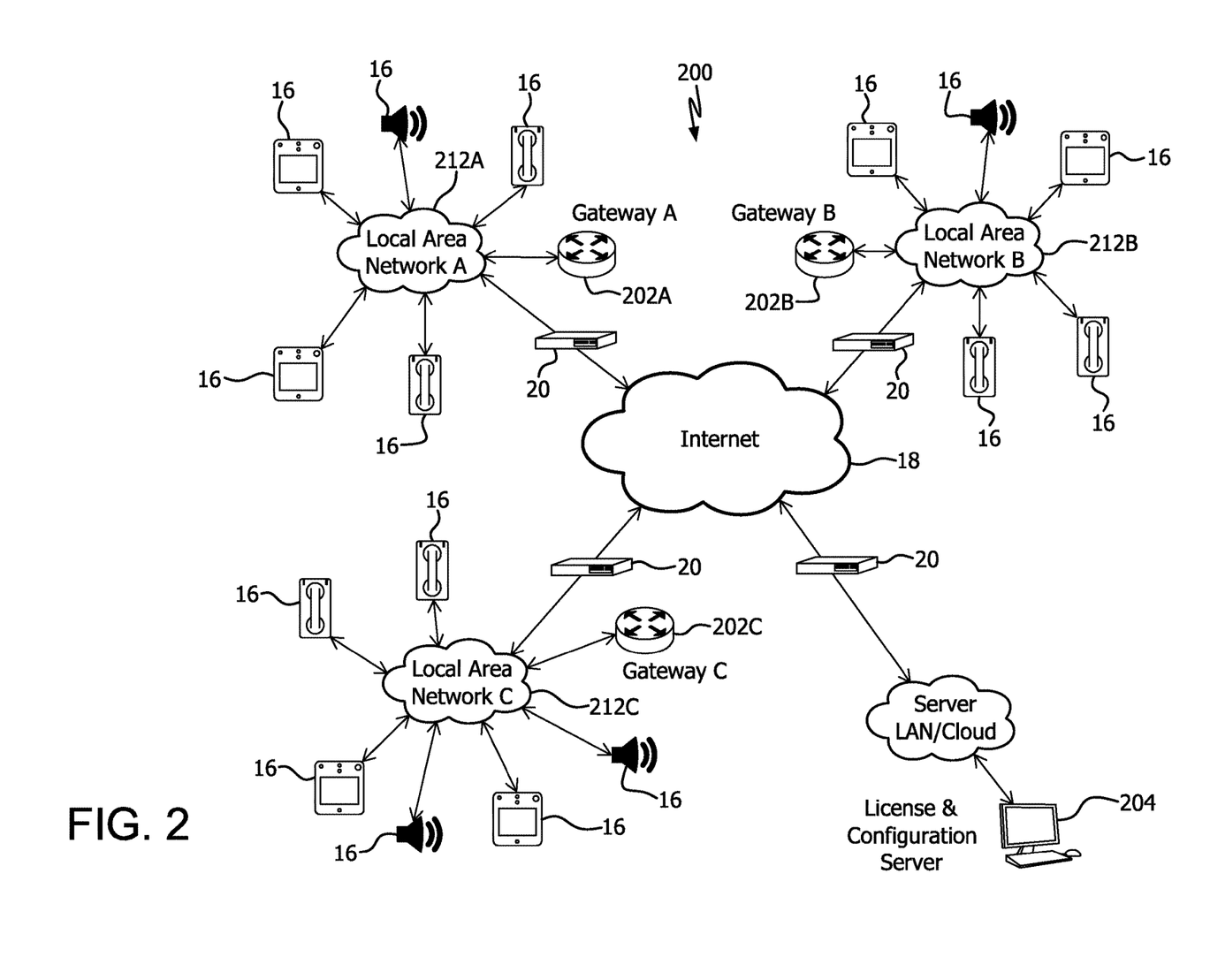
FIG. 2 depicts a system constructed in accordance with an illustrative embodiment that provides Internet connectivity among IP units deployed in different LANs.

In accordance with an advantageous illustrative embodiment depicted in FIG. 2, the Internet 18 can be used in a system 200 to add the ability to allow point-to-point audio and serverless page/party (SP2) communication among IP units 16 of different local area networks (LANs) 212$n$'s. Internet service providers (ISP), however, typically block multicast traffic in order to minimize unnecessary traffic onto the Internet. When IP units (e.g., SP2/UAP-type IP units 16) utilize multicast traffic to pass page/party audio among the IP units 16 on a LAN, a gateway device 202$n$ configured in accordance with an illustrative embodiment is used to convert multicast real-time transport protocol (RTP) traffic into unicast RTP traffic and vice versa.

In accordance with the illustrative embodiment of FIG. 2, the gateway 202 is configured allow multicast traffic from IP units 16 destined for remote LANs 12 to be routed to the Internet 18 by converting multicast RTP traffic into unicast RTP traffic, thereby avoiding being blocked by any ISP. Unicast RTP traffic is routed to all other gateways 202 that belong to an inter-LAN or Internet group (e.g. a group prescribed by a license and configuration server 204 as shown in FIG. 2). Each receiving gateway 202 is configured to convert RTP traffic inbound from the Internet 18 back into multicast traffic and broadcast it over its connected LAN 212. These operations are performed by the gateways 202$n$ in the Internet group prescribed by the license and configuration server 204. In other words, for the inter-LAN or Internet group illustrated in FIG. 2, gateway 202A can unicast RTP to gateways 202B and 202C. Gateway 202B can unicast RTP to gateways 202A and 202C. Gateway 202C can unicast RTP to gateways 202A and 202B. It is to be understood that the license and configuration server 204 can coordinate other Internet groups having the same or different LANs 212$n$ and different numbers of LANs as members.

In order for the gateways 202$n$ to determine their destinations in their Internet group(s), they are configured to determine the outward or public IP address of all gateways 202 in a particular inter-LAN or Internet group. This is done, for example, by the gateways 202$n$ contacting the license and configuration server 204 shown in FIG. 2. The host name of the server 204 is configured in each gateway 202, along with pertinent client information to identify those group or groups with which the gateway 202$n$ identifies. The license and configuration server 204 can, for example, maintain a database such as a table comprising one or more inter-LAN or Internet group identifiers, and the IP address of each gateway assigned to the respective inter-LAN or Internet groups. The license and configuration server 204 performs network address translation (NAT) and management of subscription fees for inter-LAN communication support services. Each gateway 202 contacts the server 204 and acquires the IP addresses of all gateways 202 in its assigned Internet group(s), thereby allowing each gateway 202 to directly unicast RTP via each gateway's internet IP address to all other gateways 202 in the Internet group. The server 204 can be configured to provide this service as a subscription service that requires a monthly or annual fee, for example, or as a complimentary service. The customer/user can access the server 204 via the web and configure the gateways 202 that should be part of a selected Internet group. As an additional service, the configuration aspect of the server 204 can provide the configuration of the IP units 16 on each LAN 212$n$, thereby eliminating the need for a local configuration server on each LAN 212.

Additional monitoring can be performed to ensure an end-to-end path for each gateway 202 to reach other gateways 202 in its Internet group. This can be done, for example, using a heartbeat protocol to ensure that the connection is available at all times.

Inter-LAN call traffic in accordance with the advantageous illustrative embodiment depicted in FIG. 2 has no impact on the local operation of a system of IP units 16 with SP2 function on a particular LAN 212$n$. The gateway 202$n$ is configured to broadcast converted inbound RTP to the proper multicast socket on the LAN 212$n$ from which the connected IP units 16 are configured to receive and broadcast over their amplifier/earpiece. In operation, the IP units 16 are not aware of the existence of the gateway 202$n$, and the gateway 202$n$ is not aware of the IP units 16 in its LAN 212$n$. The gateway 202$n$ simply sets up a bridge between different LANs 212$n$ to transfer normally blocked multicast RTP over the Internet.

More specifically, as described in WO 2016/100795, an IP unit 16 with the SF2 function employs multicast technology that enables multiple IP devices configured to listen on a given broadcast address to receive pages over a network from a single source and to listen to and participate on a party line. IT personnel or other administrator can allocate or program multicast addresses/ports or sockets to respective party and page lines employed by IP units 16. One or more IP units 16 can be designated as master stations to manage configuration and updating of any IP unit 16 in its system or LAN 212 using a mutual provisioning mode and a command channel. For example, multicast addresses are allocated to designated page sockets and party line sockets used by IP units 16 with SF2 function in the LAN 212*n* in accordance with a system configuration. Once configured, an IP unit 16 with SP2 function operates to listen to its configured page sockets for received audio, to transmit audio on its configured page sockets, and to participate in party line conferencing on its configured partly line sockets in accordance with the system configuration. In other words, the IP units 16 can listen for RTP on sockets to which they are configured to listen as part of a designated group and convert the RTP to audio for playback. Each IP unit 16 in a group can be listening to a party line, and multiple people can broadcast on the same party line, without the need for an IP-PBX or similar device.

For example, for party line operation, a party-line selector switch 106 (FIG. 5C) on the IP unit 16 has a multicast address/port or socket assigned for each of the five party lines to both transmit and listen to when selected. The IP unit 16 listens to the page sockets. When a party line is selected and the handset is off-hook, if configured, the amplifier audio is muted, and the audio from the selected multicast socket is routed to the earpiece and the audio from the handset microphone is transmitted on the multicast socket.

In addition to the five party line sockets, the IP unit 16 can listen on up to, for example, eight other configurable page sockets for inbound page audio. Each page socket has a priority associated with it from 1 to 8. For page operation, the IP unit 16 can broadcast received page audio while the unit is off-hook in a party-line conversation. A multicast socket is used to transmit and listen to the page line. Page audio is typically not monitored in the earpiece, but the IP unit 16 can be configured such that one station hears the page audio of another in the earpiece when the press bar is depressed. The IP unit 16 performs idle listening to all configured page sockets routing received page audio appropriately to the amplifier. Audio is not routed to the page line until the handset is off-hook and the pressbar is depressed. When the pressbar is depressed, the audio from the designated page line socket is routed to the earpiece and the audio from the microphone is routed to the page line socket.

Audio is therefore received from the LAN 212*n* by extracting the encoded payload data within RTP packet streams on sockets that: (a) the IP unit 16 is configured to listen for; and (b) the gateway 202*n* is aware of when converting unicast RTP traffic from the Internet to multicast messages for IP units 16 in its corresponding LAN 212*n*. Accordingly, the IP units 16 with SP2 function on each LAN 212*n* can be unaware of the gateway 202*n* on that LAN 212*n* and simply receive multicast audio on the multicast sockets to which they are listening. Further, the IP units 16 do not have to communicate with the license and configuration server 204 or Internet 18.

The RTP layer is the core mechanism behind the transmission and reception of audio with an IP unit 16. For the most part, the RTP layer of transmitted packets is structured according to RFC 3550. Compressed frames are transmitted from an IP unit 16 across the network using RTP over IP at a rate of either 10 or 100 MBit/s auto-negotiated. Multicast addressing is used so that each packet may be received by multiple IP units 16. Each packet of data is structured to include, for example, a unique RTP stream ID (e.g., a synchronization source (SSRC) identifier that uniquely identifies the source of a stream) and other overhead information, in addition to the encoded audio payload. Each layer of the packet structure conforms to the relevant Internet standard RFC. For example, incoming multicast packets can include a unique source ID in addition to a sequence number. The sequence number is incremented for each packet, which allows a receiving IP unit 16 to properly sequence them to recreate the digital audio stream. The source ID or SSRC included in each RTP packet is a fixed number unique to each IP unit 16. The receiving IP unit 16 can receive multiple streams from multiple IP units 16. The SSRC is used to keep the streams organized so that the RTP stream from each transmitting IP unit 16 can be properly mixed in the receiving IP unit 16.

Figure 3:
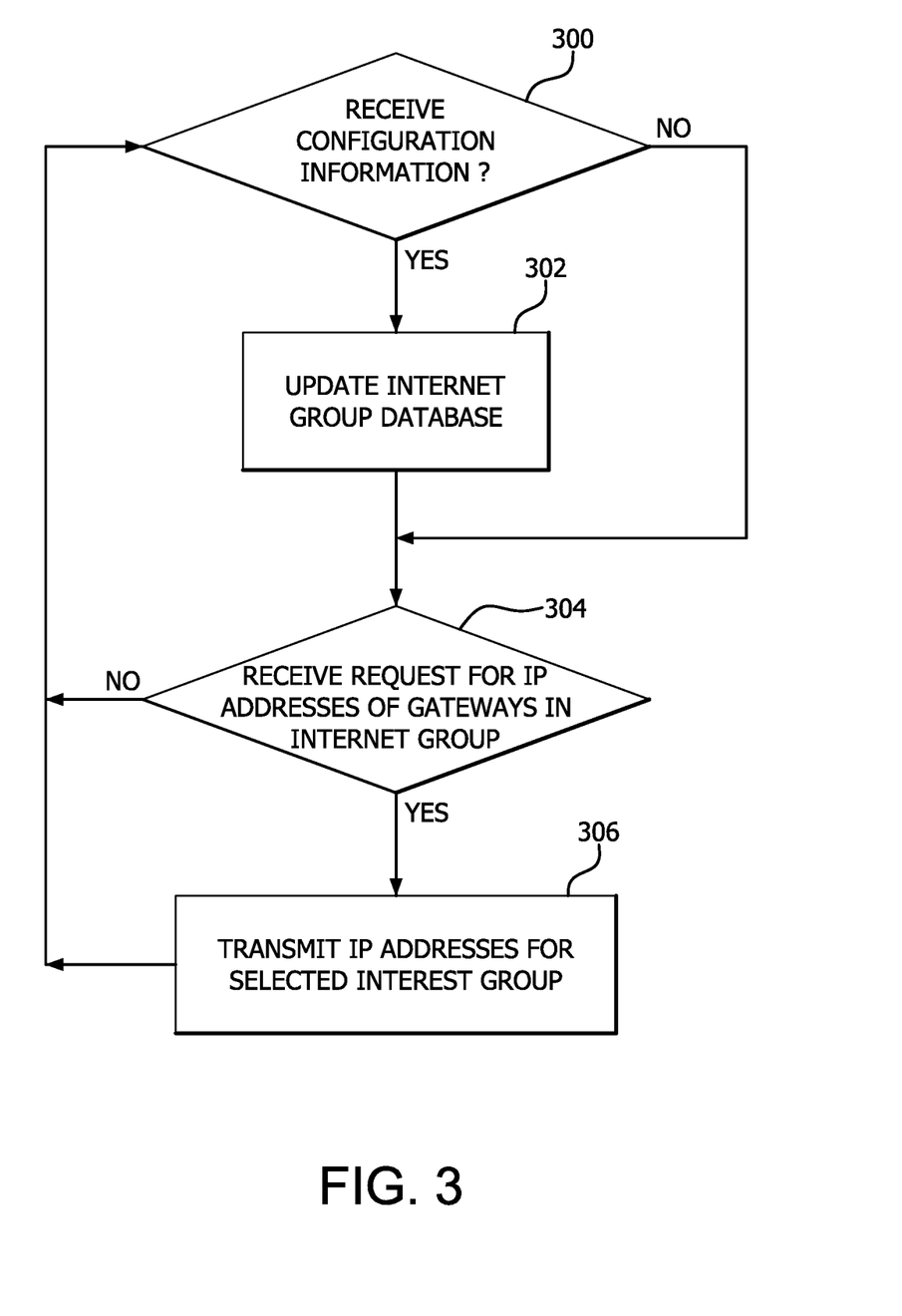
FIG. 3 is a flow chart depicting gateway operations for inter-LAN call functionality among IP units in accordance with an illustrative embodiment.

With reference to FIG. 3, the license and configuration server 204 is configured to receive configuration information from system users or administrator, who can assign IP units 16 in a LAN 212 to one or more inter-LAN or Internet group(s) comprising the IP units 16 of one or more other LANs 212*n* (block 300). The license and configuration server 204, in turn, updates its database of inter-LAN or Internet groups and the corresponding IP addresses of the gateways 202*n* assigned to each of these groups (block 302). Each gateway 202 can send a request for the IP addresses of the gateways assigned to its group(s) (block 304), and the license and configuration server 204 responds to these requests with the requested information (block 306). A gateway 202, in turn, uses the IP addresses of the gateways 202*n* in its selected inter-LAN or Internet group to convert a multicast message into a unicast message to each respective IP address in its group.

Figure 4:
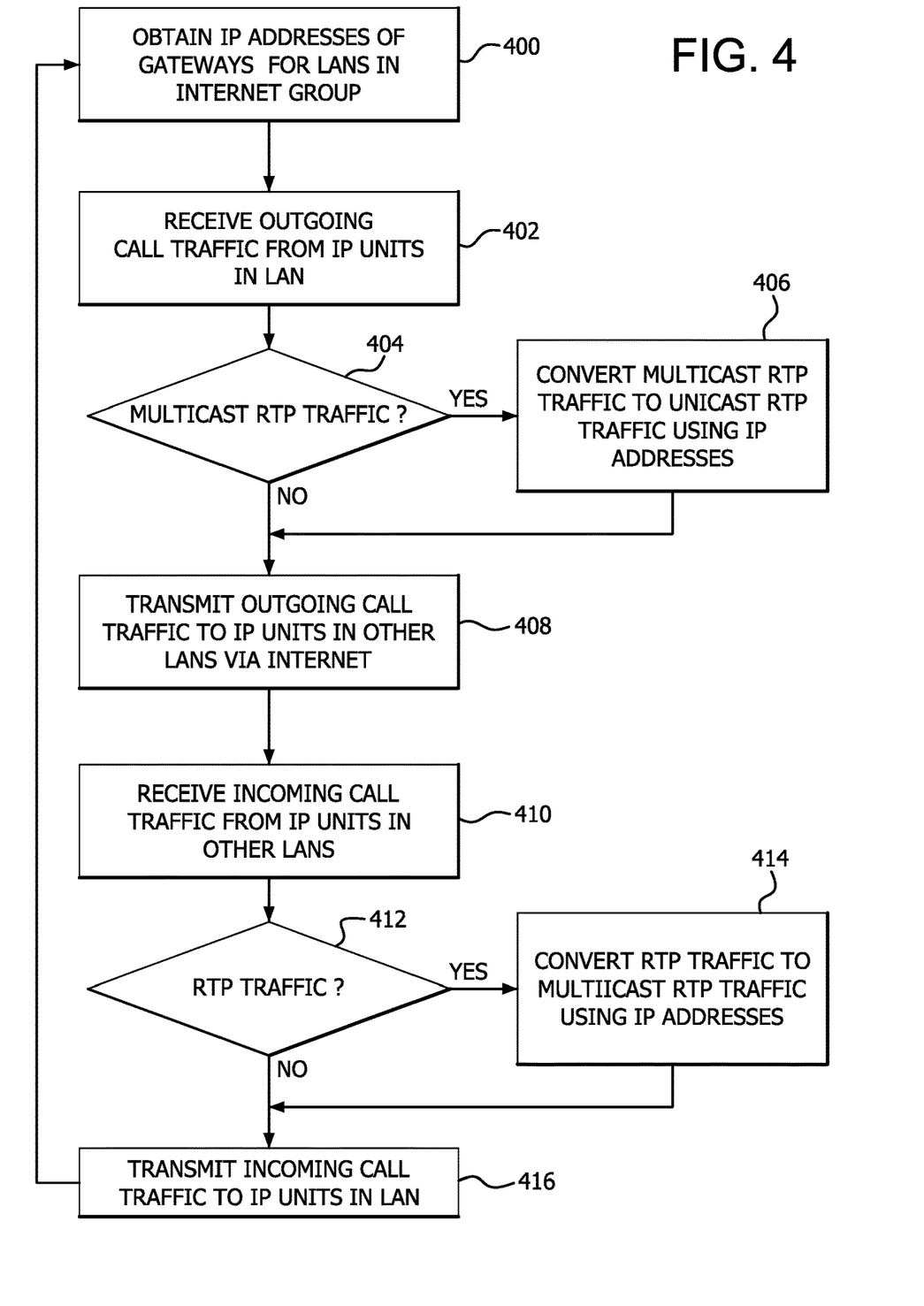
FIG. 4 is a flow chart depicting license and configuration server operations for inter-LAN call functionality among IP units in accordance with an illustrative embodiment.

With reference to FIG. 4, a gateway 202 is configured to obtain the IP addresses of the gateways 202*n* assigned to its selected inter-LAN or Internet group (e.g., from the license and configuration server 204) (block 400). When outgoing call traffic is received from an IP unit 16 in the gateway's LAN 212 (block 402) and the call traffic contains multicast RTP traffic (e.g., for SP2 function page/party audio) (block 404), the gateway converts the multicast RIP traffic into unicast traffic using the IP addresses of the gateways assigned to its selected inter-LAN or Internet group (block 406). The converted call traffic is transmitted to other the LANs using the Internet (block 408).

With continued reference to FIG. 4, the gateway 202 is configured to receive incoming call traffic via the Internet (block 410). If the incoming call contains RTP traffic (block 412), the gateway converts the RTP traffic to multicast RTP traffic (block 414) before transmitting it to the IP units with SP2 function in its LAN 212.

Illustrative IP Units 16

Figure 5A:
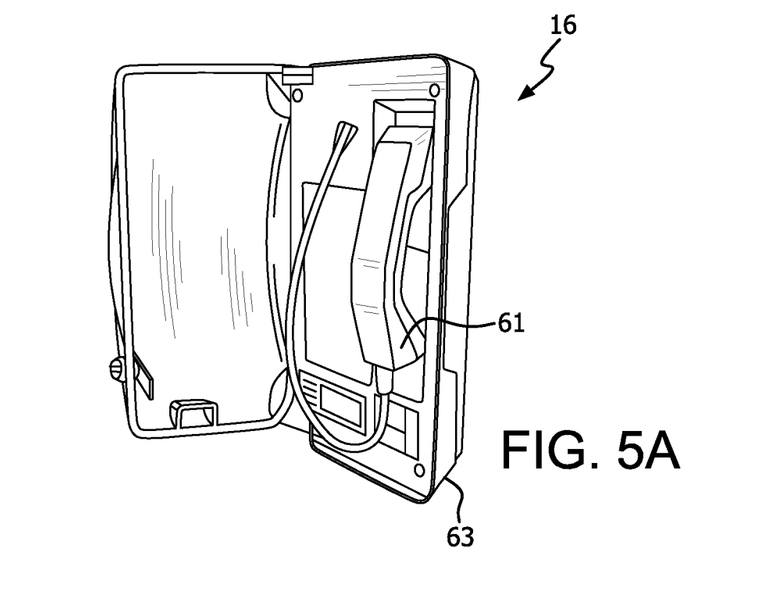
FIGS. 5A and 5B are perspective views of illustrative housings for IP units in accordance with illustrative embodiments.
Figure 5B:
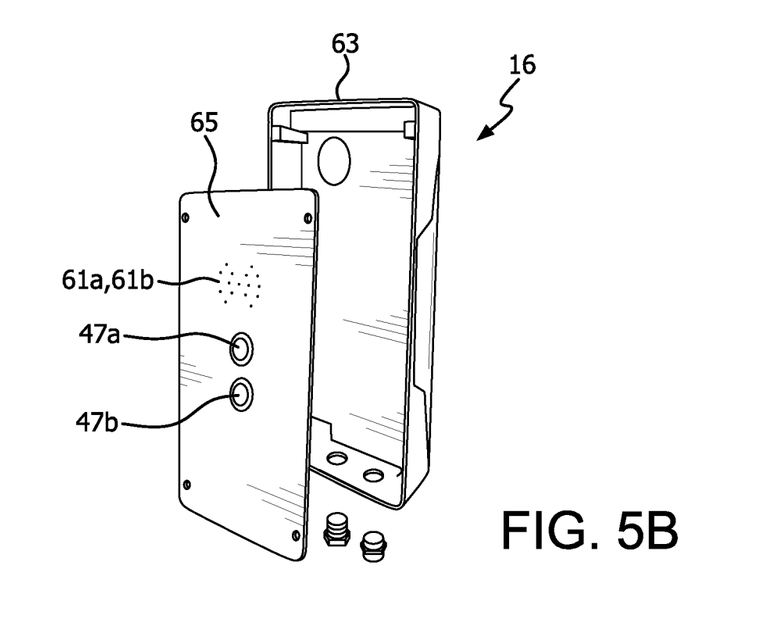

An IP unit 16 typically has a speaker 61*a* and microphone 61*b* integrated with the unit faceplate, or provided in a handset 61, and an optional push to talk (PTT) non-latching push button, as shown in FIGS. 5A, 5B and described in connection with FIG. 6. Some IP units 16 may have up two separate memory number auto dial non-latching push buttons (e.g., buttons 47*a* and 47*b* in FIG. 5B). The microphone 61*b* on the unit 16 remains muted unless the PTT is depressed. On receiving a call, the alerting ring tone can be emitted from the speaker 52. The power requirements for these IP units 16 can be fulfilled from batteries charged by a local solar panel, for example, or provided via wireless power (e.g., Power Over the Ethernet) or wired power. If a call is in progress, then pressing a memory number auto-dial push button ends the call; otherwise, it initiates a call to a preprogrammed number. Where a IP unit 16 has been fitted with two memory number auto-dial push buttons 47*a*, 47*b* as illustrated in FIG. 5B, for example, pressing either push button ends a call that is in progress or initiates a call to the preprogrammed number associated with that push button. Buttons can be optionally prioritized. It can also be optional for a push button to end a call if in its configuration. The number of fitted push buttons is only limited by the number required for the application.

Figure 5C:
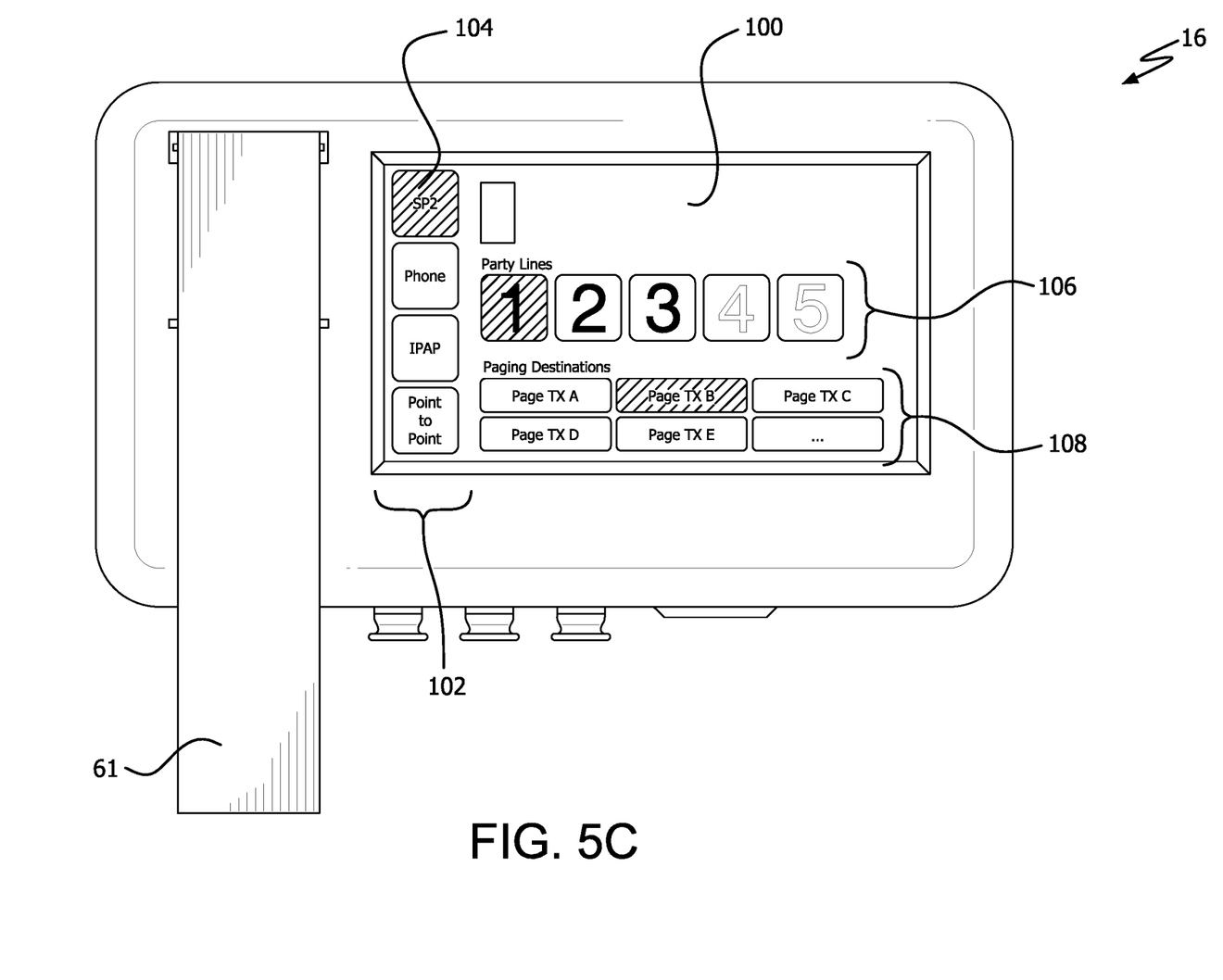
FIG. 5C illustrates an example IP unit with touch screen display constructed in accordance with an illustrative embodiment.

With reference to FIG. 5C, the IP-based unit 16 is configured in a housing with a handset 61, but could also be hands free. The GUI screen 100 in FIG. 5C shows operational mode selection buttons 102 with the SP2 mode button 104 selected on an SF2 mode screen. The SP2 mode screen 100 in FIG. 5C includes party line buttons 106 (e.g., five buttons although a different number of party line buttons can be provided) and paging destinations indicated at 108. In this mode of operation, the IP unit 16 provides the full capabilities of the hardware-based SF2 currently available and described in commonly-owned WO 2016/100795 incorporated by reference herein, but also with several enhancements. These enhancements include but are not limited to, for example, the ability to access more than the current maximum of five party lines indicated at 106. Instead of party lines being numbered 1 through 5, they can now be named using GUI screens on the touch screen display 46. In addition, the IP unit 16 can indicate party lines that are currently in use by others to allow quick party-line selection. The example illustrated IP unit 16 has the ability to transmit to 5 page zones that are numbered 1 through 5. With the enhancements of GUI screens on a touch screen display 46, zones can be also named (e.g., alphanumerically and/or using GUI symbols). The display 46 can indicate which zones have activity and which zone is currently being broadcast through the unit 16's amplifier and speaker 61. It is understood, however, that other types of IP units can be used in accordance with the illustrative embodiments to send IP calls to IP units in other LANs.

An IP unit 16 with SP2 function is fast. Since no server is needed to set up call routing and conference bridges, the IP unit 16 with SF2 function can provide immediate one way paging and full-duplex "party line" communication. Also, since an IP unit 16 with SP2 function can operate in serverless system, it can easily be integrated into an existing IP network. This can significantly reduce the installation cost of an SP2 system and simplify plant data architecture. An IP unit 16 with SP2 function is simple since there is no keypad required and no extensions to memorize. The user simply lifts the handset, selects a paging zone, squeezes the handset pressbar, and makes an announcement over system speakers. The user can release the pressbar and talk on one of the five available party lines. IP units 16 with SF2 function can be supplied with a handset 61 for paging and intercom as illustrated in FIGS. 5A and 5C, or without a handset as illustrated in FIG. 5B for where only paging coverage is needed, for example.

Figure 6:
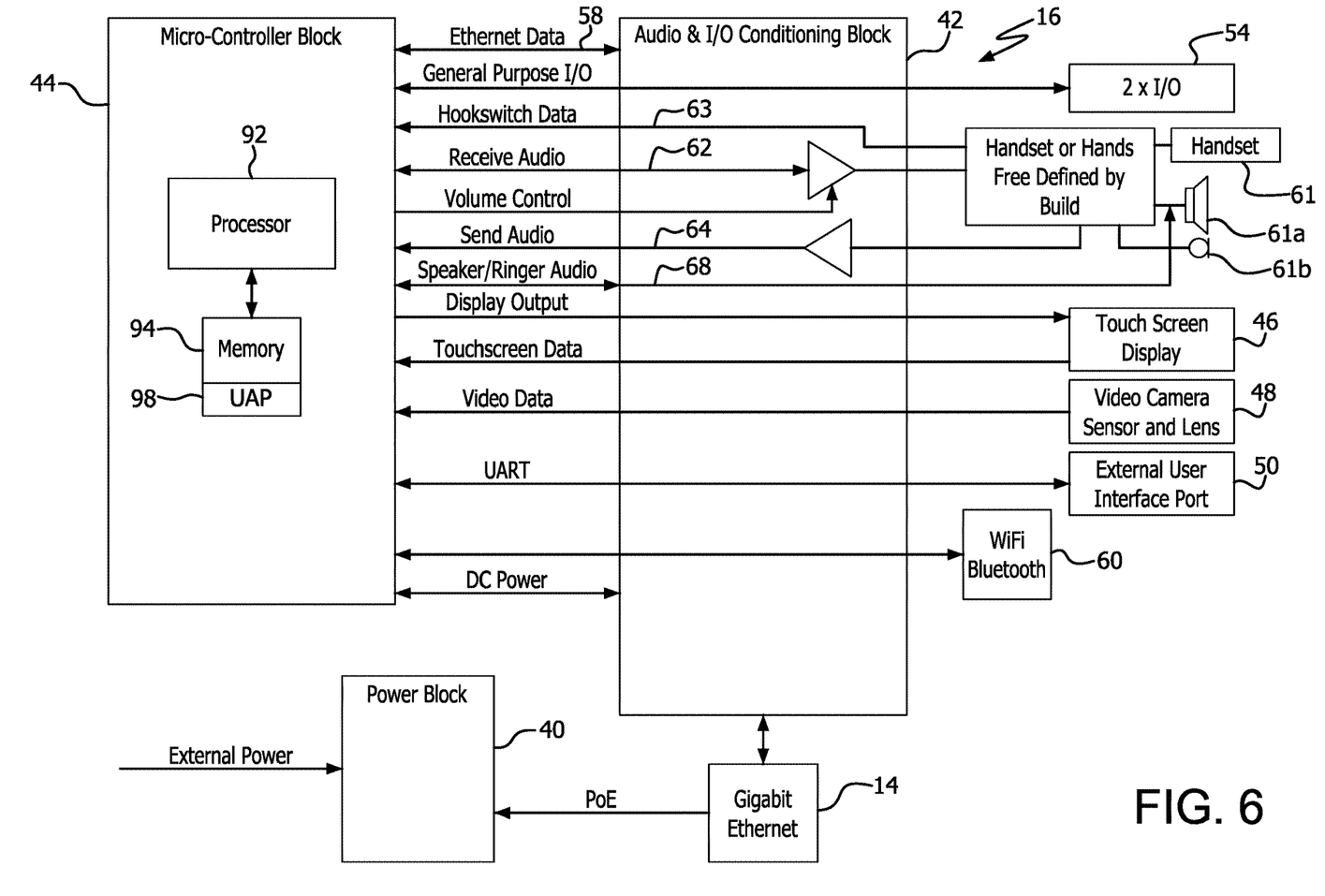
FIG. 6 is a block diagram of components of a IP unit in accordance with an illustrative embodiment.

FIG. 6 illustrates an example IP unit 16. As shown in FIG. 6, a VoIP telephone unit 16 can be provided, for example, with a control block or module 44, a signal conditioning block or module 42, a power block or module 40 and a handset 18 or hands free microphone 62 and speaker 61. The control module 44 is described in more detail below. The signal conditioning module 42 is connected to an Ethernet network wirelessly or using fiber optic cable or copper, for example, via an Ethernet interface 14. The unit 16 is provided with a touch screen display 46, a video camera sensor and lens 48, and an external user interface port 50. The unit 16 can have a power block or module 40 to receive power via Power over the Ethernet (PoE) or POE Plus, although other power sources can be used.

A wireless communication interface (e.g., IEEE 802.11, WiFi, Bluetooth™ or other protocol) 60 can be provided to allow wireless communication between the unit 16 and another device such as a smart phone, sensor, Internet of Things (IoT) device, and so on. The packet structure in the RTP layer employed in accordance with the illustrative embodiments can be configured to accommodate different signal traffic and different applications such as commands or transferred data sent from an IP unit to another IP unit in a different LAN, wherein the commands or transferred data comprises power signals, sensor data, device commands and the like for remote operation of and communication with various devices (e.g., devices in HVAC systems, lighting control systems, security systems, entertainment systems, and so on).

The touch screen display 46 can be ruggedized, that is, it can consist of an impact-resistant screen or screen layer, for example, whereby the glass is laminated or bonding is used to prevent glass breakage from breaking any seal deployed inside the unit 16 for HA-compliance reasons. In accordance with one illustrative embodiment, the touch screen display 46 can be an automobile-grade liquid crystal display (LCD) screen (e.g., a 7" display) capable of withstanding a considerable range of temperatures (e.g., –30° C. to 70° C.), and having optional full sun and/or wide view visibility, that is expected in the automobile environment. Further, the display 46 is mounted in a housing of a unit 16 to withstand vandalism and weather and, as needed, to comply with HA classification requirements.

The unit 16 is provided with a magnetic hook switch sensor (e.g., coupled to the handset 18's cradle, not shown), the output 63 of which can be coupled to the signal conditioning block or module 42 for providing on-hook/off-hook status data of the handset 18 to the control module 44. As stated above, the signal conditioning module 42 is configured to provide public address (PA) speaker audio 68, as well as earpiece/speaker audio 62 from the control module 44 for the handset or hands free speaker and receive microphone audio 64 from the handset or separate microphone for the control module 44. The signal conditioning module 42 is also configured to provide input data from the touch screen 46 and DC power to the VoIP control board 44. General Purpose Monitored Inputs/Outputs (I/O) are provided as generally indicated at 54.

The signal conditioning module 42 and the control module 44 are configured to process Ethernet data 58. The control module 44 in a unit 16 can comprises a programmable processor 92 and integral or separate memory 94. As stated above, the microprocessor 92 can be, for example, a digital signal processor (DSP) or system on chip (SOC) with standard VoIP/SIP software. The control module 44 can employ, for example, an audio CODEC (e.g., 8 kHz G711A/U Law) to provide full duplex hands free speech; that is, when in a call, the units 16's audio will be full duplex (i.e., transmit and receive simultaneously with no switching).

In accordance with aspects of the illustrative embodiments, the units 16 are programmed (e.g., via software code instructions executed by their respective processors 92 and, for example, in accordance with a universal application platform 98) to establish and terminate point-to-point calls and participate in party line calls, among other operations in accordance with each of the plurality of operational modes. As stated above and in accordance with an embodiment, the VoIP telephone unit 16 is a configurable multi-function device with universal application platform 98 that is preprogrammed to operate in any of a plurality of modes of operation. The plurality of operational modes can be, but are not limited to, two of more of the following modes: a VoIP telephone mode, a serverless page-party station mode, an access panel mode, a serverless point-to-point intercom mode, a party line call mode, and a video call mode, and so on.

It will be understood by one skilled in the art that this disclosure is not limited in its application to the details of construction and the arrangement of components set forth in the above description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mourned," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the illustrative embodiments can be easily construed as within the scope of claims exemplified by the illustrative embodiments by programmers skilled in the art to which the illustrative embodiments pertain. Method steps associated with the illustrative embodiments can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of claims exemplified by the illustrative embodiments. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

The above-presented description and figures are intended by way of example only and are not intended to limit the illustrative embodiments in any way except as set forth in the following claims. It is particularly noted that persons skilled in the art can readily combine the various technical aspects of the various elements of the various illustrative embodiments that have been described above in numerous other ways, all of which are considered to be within the scope of the claims.

The invention claimed is:

1. A gateway configured to send Internet protocol (IP) unit multicast audio call traffic via the Internet comprising:
   a communications interface to a local area network (LAN) to which IP units are connected, the IP units being configured to send and receive page audio with respect to other IP units and to participate in a party line call with other IP units using multicasts;
   a communications interface to the Internet;
   a memory device configured to store
      an IP address for each of one or more gateways in at least one designated inter-LAN group that are located in different LANs and that perform inter-LAN communication with the gateway, and
      configuration information comprising sockets for page audio and party line calls assigned to the IP units in the LAN;
   a processor configured to
      request from a remote database the IP addresses of the gateways that are assigned to each inter-LAN group that performs inter-LAN communication with the gateway and to store the IP addresses in the memory device, each inter-LAN group comprising designated IP units from different LANs that can communicate with each other via multicast,
      receive a multicast from an IP unit in the LAN and convert the multicast to respective unicasts using the IP addresses of gateways in the designated group that corresponds to the multicast before transmission thereto via the Internet, the multicast destined for IP units in one or more different LANs that correspond to the designated inter-LAN group, and
      receive unicasts from the Internet and convert the unicasts to a multicast provided to a corresponding socket based on the configuration information of the IP units in the LAN.

2. The gateway of claim 1, wherein the processor is further configured to store in the memory device a corresponding group identifier for each inter-LAN group that performs inter-LAN communication with the gateway.

3. The gateway of claim 2, wherein the remote database is configured to store the configuration information of the IP units in the respective LANs.

4. The gateway of claim 1, wherein the processor is configured to convert multicast real-time protocol (RIP) traffic in the multicast to unicast RIP traffic and to route the unicast RTP traffic to the IP addresses of the gateways in a designated one of the groups.

5. A method for sending multicast audio call traffic among Internet protocol (IP) units via the Internet comprising:
   providing gateways at respective local area networks (LANs) of IP units, the IP units being configured to send and receive page audio with respect to other IP units and to participate in a party line call with other IP units using multicasts;
   assigning IP units from different ones of the LAN to one or more Internet groups and, for each Internet group, storing the IP addresses of the gateways corresponding to the IP units assigned to that Internet group at each of the gateways that correspond to that Internet group;
   receiving, at a gateway, a multicast from an IP unit in its LAN corresponding to at least one of page audio and party line audio, the multicast destined for a designated one of the Internet groups, and converting the multicast to respective unicasts using the stored IP addresses of the corresponding gateways in the designated one of the Internet groups; and
   transmitting the unicasts via the Internet.

6. The method of claim 5, wherein the unicasts comprise streams of packets with overhead information and audio payload, the overhead information identifying the IP unit that is the source of the audio payload and providing a sequence number to allow an IP unit receiving the packets to organize and mix the streams in accordance with the at least one of page audio and party call audio in the multicast.

7. The method of claim 5, further comprising receiving unicasts from the Internet at the corresponding gateways in the designated Internet group, and the corresponding gateways converting the unicasts to a multicast.

8. The method of claim 7, further comprising storing, using at least one of the gateways and a server, configuration information comprising sockets for page audio and party line calls assigned to the IP units in the LAN corresponding each of the gateways.

9. The method of claim 8, further comprising corresponding ones of the gateways in the designated Internet group providing the multicast to a corresponding socket based on the configuration information of the IP units in the LANs associated with the corresponding gateways.

* * * * *